United States Patent [19]
Anderson et al.

[11] Patent Number: 6,041,155
[45] Date of Patent: Mar. 21, 2000

[54] UNIVERSAL DUST COVER

[75] Inventors: David C. Anderson, St. Louis, Mo.;
Daniel Lee Stephenson, Lilburn, Ga.

[73] Assignee: Lucent Technologies Inc., Murray Hill, N.J.

[21] Appl. No.: 08/988,520

[22] Filed: Dec. 10, 1997

[51] Int. Cl.[7] ...................................................... G02B 6/00
[52] U.S. Cl. ............................................................ 385/139
[58] Field of Search ............................ 385/139; 220/827, 220/831, 832; 359/511

[56] References Cited

U.S. PATENT DOCUMENTS

5,030,120  7/1991  Hartley ..................................... 439/144
5,506,922  4/1996  Grois et al. .............................. 385/75

Primary Examiner—Rodney Bovernick
Assistant Examiner—Robert E. Wise

[57] ABSTRACT

A connector adapter and dust cover therefor are pivotably connected by means of a pivot pin on the adapter and pivot arms on the dust cover whose distal ends engage the pivot pin. The pivot pin has a cam member located intermediate its ends, and the dust cover has a spring arm between the pivot arms whose distal end engages the cam member. In the closed position, the distal end of the spring arm engages the cam below its high point. In the fully open position, the distal end of the spring arm engages the cam beyond its high point. In both positions, the spring arm bears against the cam to resist dislodgment of the dust cover from either position.

18 Claims, 5 Drawing Sheets

UNIVERSAL DUST COVER

FIELD OF INVENTION

This invention relates to lightguide connector adapters for use in interconnecting optical fibers and, more particularly, to an adapter and a dust cover or shutter for blocking light energy within the connection and for preventing contaminants from entering vacant adapter apertures.

BACKGROUND OF THE INVENTION

Optical fiber transmission systems are becoming widely used in the transmission of signals such as data, voice and the like and, in many instances, are replacing traditional electrical systems. Many of the arrangements common to electrical systems, such as coupling, interconnection, splicing, and the like have their counterparts in optical systems but, because of the totally different characteristics of the transmission media, ie., optical fiber versus metallic wire, connectorization, splicing, and the like involve quite a different apparatus. Where, for example, it is necessary to make a great number of connections in one location, both systems may use what is referred to in the art as patch panels, which provide arrays of connector adapters for interconnection, but the interconnections themselves are generally quite different.

It is common practice in the optical connector art to terminate a length of optical fiber with a connector, an example of which is the SC type connector that is shown and described in U.S. Pat. No. 5,212,752 of Stephenson et al There are numerous types of such fiber terminating connectors, and, inasmuch as there has been little effort directed to standardization, each type of connector generally requires a different coupling arrangement to permit interconnection of two fibers, for example. The SC and ST type connectors are becoming more and more popular, and the remainder of the discussion, in the interest of simplicity, is devoted primarily to such connectors. It is to be understood that the following description of the principles and apparatus of the invention is applicable to other types of connectors as well such as, for example, the LC type. As is shown in that Stephenson et al. patent, an SC connector includes a ferrule assembly including a barrel having a collar at one end and an optical fiber terminating ferrule projecting from the barrel. The ferrule assembly is disposed in a plug frame such that an end portion of the ferrule projects from one end of the frame. The plug frame is configured to snap lock into a grip member having a locating key thereon, and the grip is inserted into one side of a slotted coupler adapter, with the locating key inserted into the slot. The grip of a corresponding SC connector is inserted into the other side of the adapter so that the ends of the ferrules abut each other to form a low insertion loss optical interconnection. In the SC connector, the ferrules are spring loaded longitudinally to insure contact between the fiber containing ferrule ends. The entire interconnect operation involves linear motion only and results in a low insertion loss, mechanically stable, protected junction between two fibers. The expenditure of time in making the interconnection is small and the operator or installer is relieved of having to perform anything other than simple linear motion in plugging the connectors into the coupling adapter.

When large numbers of such interconnections are to be made, it is common practice to use patch panels for holding an array of a large number of coupler adapters. Thus, there can literally be hundreds of such adapters, all in close proximity to each other, mounted in the panel. As long as only a single type of connector, such as the SC connector, is involved, simple adapters may be used for plugging in the connectors from each side of the patch panel. In view of the fact that there are several different types of connectors in widespread use today, it has become common practice to replace the simple adapters with buildout blocks or buildout coupling adapters. In U.S. Pat. No. 5,274,729 of King et al., there is shown a buildout coupling adapter system in a patch panel that makes possible interconnections among the several different types of connectors in any combination thereof. As can be seen in that patent, a buildout block at one side (or end) thereof is configured the same as a simple coupler adapter having a keyway for receiving, for example, an SC connector. The other end of the buildout block is formed to receive a buildout which may be configured to receive and hold, for example, an SC, an ST, or an FC connector. Thus, the patch panel may be, on one side thereof, pre-connectorized with optical fibers all of which are terminated by SC connectors, and the other side of the panel is ready to receive pre-connectorized fibers terminated by any one of the numerous connectors. Such an arrangement is more versatile and adaptable than those arrangements which are limited to a single type of pre-connectorized fiber. Such an arrangement also functions well in those installations where one side of the panel is not readily accessible. Thus, the panel can be pre-connectorized before mounting in position on the side which will be relatively inaccessible, after which it can be mounted in place, ready to receive the numerous connections thereto, regardless of connector type.

In any such arrangement, there is always the possibility of airborne contaminants or dust entering vacant apertures in the adapter as well as a potential safety hazard. Where one or more of the pre-connectorized fibers is carrying optical energy, such energy can be emitted from the end of the fiber connector and pass through the buildout block or coupling adapter to the side of the panel where connections are to be made. This optical energy can be harmful for the operator or installer and can be especially harmful to his or her eyes. This hazard is most prevalent when an active connection has to be repaired or otherwise altered by removing an existing connectorized fiber and replacing it with another. In such an instance, it might be difficult or otherwise impractical to shut off the signal transmission in that particular fiber circuit, hence, the installer is forced to deal with a light emitting junction or connection.

This hazard has been recognized and there have been efforts made, in the prior art, to provide a dust cover for the opening in the buildout block or adapter to block at least some of the light emanating from a fiber connection through the open adapter. One such arrangement comprises a door like member pivotally mounted to the end of the adapter, with a biasing spring adapted to maintain the door in its closed position, blocking the open end of the adapter. When a connection is to be made, the installer, for example, presses on a projecting ledge at the end of the door to pivot the door up against the spring bias. The door has to be held open while the connector is inserted into the adapter. Thus, the installer is forced to use both hands in making a connection. In most patch panels, the adapter or buildouts are arrayed quite close together, thereby making it awkward or difficult for the installer to open the shutter or door and hold it open without interfering with other connections. In addition, there is a moment, when the door is pivoted open, when light energy is not blocked and thus emerges from the adapter. Prior art arrangements of the spring loaded type are not, therefore, completely successful in that they require the use of two hands, and do not completely block the light during connectorization.

In U.S. Pat. No. 5,687,268 of Stephenson et al (Stephenson 6-1) incorporated herein by reference, there is shown an optical shutter for a lightguide adapter which overcomes many of the problems encountered in the prior art.

The invention disclosed in that application is an optical shutter or dust cover for use with optical fiber coupling adapters which has a front, transverse face which is sufficient to cover the opening in the adapter. The transverse portion has a pair of pivot arms extending from either side thereof which are adapted, at their distal ends, to be pivotally connected to the coupling adapter, thereby providing a pivotal mounting for the shutter. The transverse face also has a flange extending from one end thereof to permit actuation of the shutter, ie., opening or closing by means of the connector to be inserted in the adapter or after its removal from the adapter. The shutter is gravity operated, and provides the desired degree of protection; however, it depends upon gravity and friction for proper operation, and, where the adapter is mounted vertically in the patch panel, the gravity actuation is nullified and the shutter may be accidentally opened or moved from the closed position.

Another problem inherent in the adapter arrangement is that dust or other contaminants can enter the openings which receive connectors when no connectors are inserted therein. Heretofore, various types of plugs have been used to close the vacant openings, but these are easily lost or otherwise mislaid.

SUMMARY OF THE INVENTION

The present invention overcomes most of the problems and disadvantages of the prior art, as discussed in the foregoing, and comprises an adapter and shutter assembly for use with, for example, a patch panel or other apparatus for retaining or containing adapters.

In a first preferred embodiment of the invention, the dust cover of the invention comprises an L-shaped member having a top surface and a front surface which is large enough to block the connector receptacle. Extending from the top surface at an angle thereto are first and second spaced pivot arms. Centrally located between the pivot arms and extending from the top surface also at an angle thereto is a spring arm having a distal end which has a slightly curved section adjacent the end. The L-shaped dust cover, the pivot arms, and the spring arm are preferably molded in one piece and are made of a suitable plastic material which is relatively hard and durable and fatigue resistant so that it does not lose its characteristics under use, i.e., as will be apparent hereinafter, the spring characteristics. Each of the pivot arms has a distal end forming an interior face, and each face has a detent recess therein.

The adapter comprises a base and a cap member. The cap member has one or more apertures thereon for receiving fiber optic connectors, each cap being adapted to receive a particular type of connector, such as an SC, ST, or an LC connector. Regardless of the particular type of connector, an arm extends from the rear of the cap toward the front thereof over the top surface, and spaced therefrom. On the distal end of the arm is a pivot pin which extends transversely to the opening or openings in the cap and is also parallel to the top surface and spaced therefrom. The two ends of each of the pivot pins are adapted to fit into the detent recesses in the pivot arm faces of the dust cover member whereby it is pivotable with respect to the cap member. Each of the pivot pins has a projecting cam located approximately midway between the two ends, upon which the curved distal end of the spring arm is adapted to bear when the pivot arms of the dust cover member are mounted to the pivot pin. The resilience of the arms is sufficient to maintain them in contact with the ends of the pivot pin.

The dust cover member, when mounted to the cap so that the ends of the pivot pins ride within the detent recesses, and the distal end of the spring arm rests on top of the cam, is held in position by the action of the spring arm against the cam. Thus, when the dust cover member is mounted so that its front portion blocks the aperture in the cap, dust or other contaminants cannot enter the aperture, light carried by a fiber optic connector mounted in the base is at least partially blocked and accidental or gravity movement of the dust cover is prevented. However, when it is desired to insert a connector into the aperture, the connector is made to bear against the bottom surface of a transverse flange on the bottom edge of the front face of the dust cover and lifted, thereby pivoting the dust cover to an open position allowing the connector to be inserted in the opening or aperture in the cap. This process is similar to that shown in the aforementioned U.S. Pat. No. 5,687,268 of Stephenson et al. In practice, the light signals are essentially blocked.

Further rotation of the dust cover member causes the distal end of the spring arm to ride over the crest of the cam, i.e., the high point of the can lobe. Thus, when there is no connector in the aperture but access to the interior thereof, as for cleaning, is desired, the dust cover member can be rotated to the fully open position, and the end of the spring arm, having passed the high portion or crest of the cam, prevents it from closing. Thus, with the present inventions, the dust cover has three basic positions; closed, open to allow a connector to be inserted into the aperture, and fully open. In the closed and fully open positions, the spring arm and cam action hold the dust cover in its position against accidental or gravity actuated movement.

The arrangement of the present invention guarantees that the dust cover, regardless of the orientation of the adapter, e.g., vertical or horizontal, will stay in its position until a positive, deliberately applied, force moves it. In addition, the dust cover member may be removed from the cap and stored until needed, thus, in the assembly of the patch panel, or in the mounting of the adapter thereto, it will not interfere with the installation. The dust cover member is universal, in that it fits readily on to an SC, ST, LC, or other type cap, thereby avoiding special adaptation to accommodate different types of connectors.

The numerous principles, features, and advantages of the present invention will be more readily apparent from the following detailed description, read in conjunction with the accompanying drawings.

DETAILED DESCRIPTION

Figure 1:
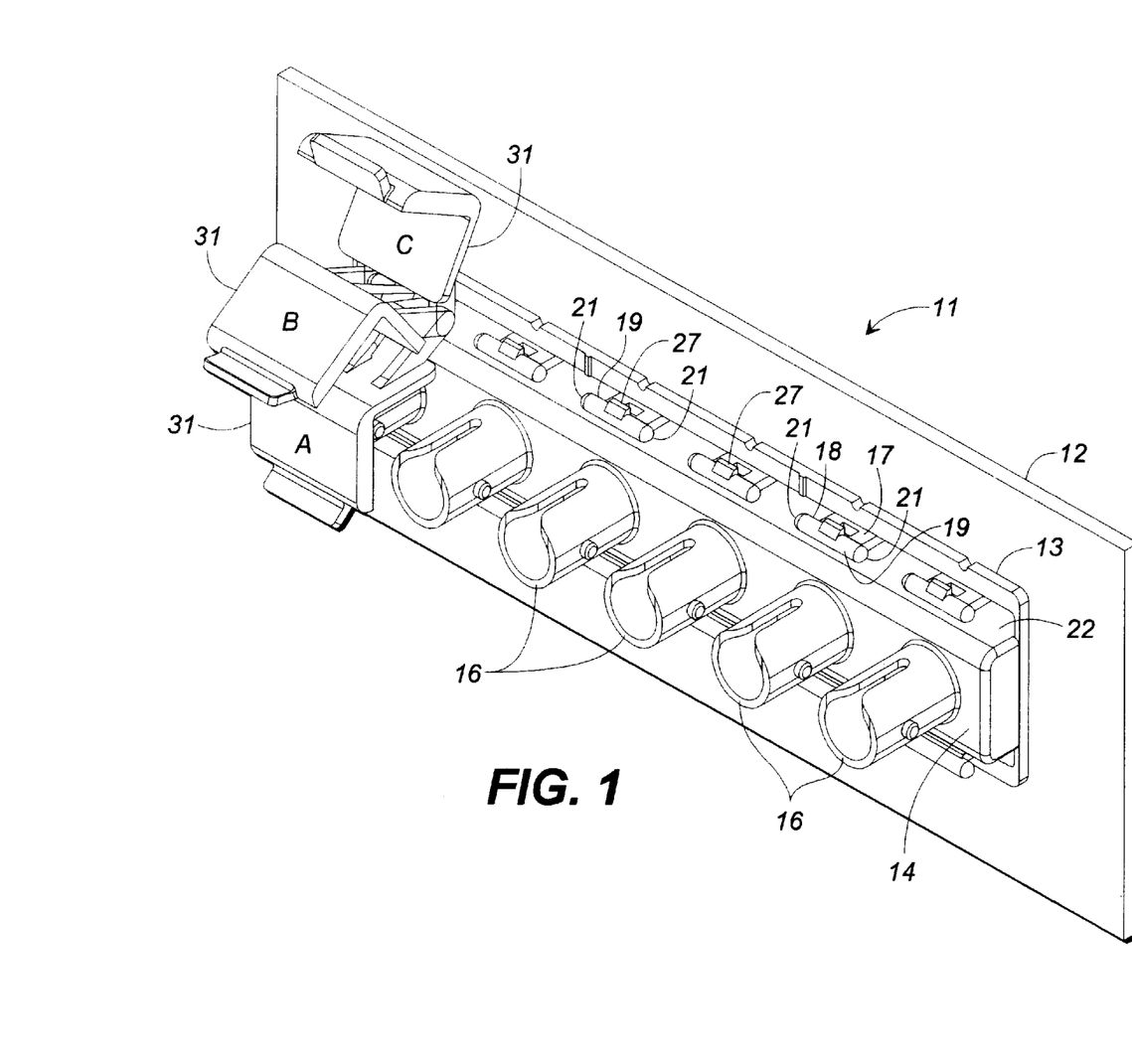
FIG. 1 is a composite view, in perspective, of an ST type ganged adapter and the dust cover of the invention.

FIG. 1 is a perspective, composite view of the adapter cap and shutter assembly incorporating the principles and features of the present invention, and illustrating the three basic positions of the shutter.

In the following description and claims, terms such as "upper", "lower", "top", "bottom", "underside", and the like, refer to elements as shown oriented in the drawings, and not necessarily to the orientation of the elements in actual practice.

Figure 2A:
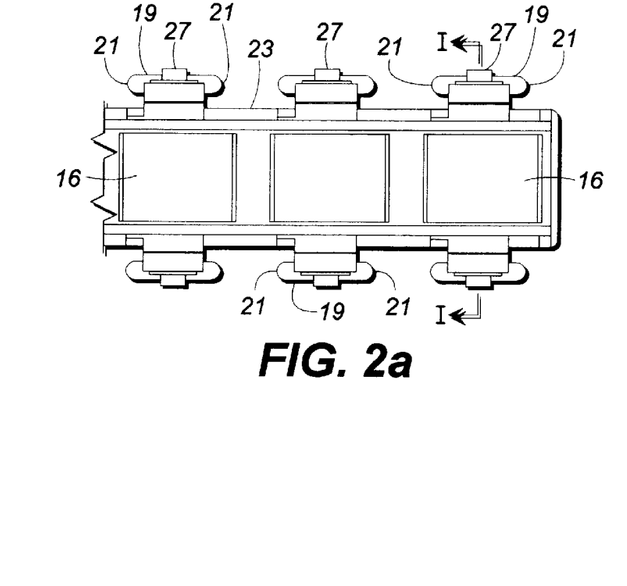
FIG. 2a is a rear view of a ganged SC type adapter cap.
Figure 2B:
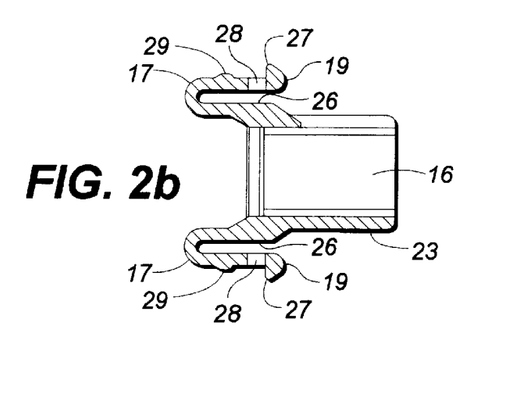
FIG. 2b is a cross-section view of the adapter cap of FIG. 2a along the line I—I thereof.

The assembly 11 of FIG. 1 comprises a patch panel 12 to which is mounted an adapter 13, only the cap 14 of which is visible. As shown in FIG. 1, for illustrative purposes only, cap 14 accommodates the ST type of optical fiber connector. Depicted in FIG. 1 is a ganged ST connector cap 14 having a plurality of receptacles 16 for receiving ST connectors. It is to be understood, however, that the principles of the invention apply to individual adapters, or to build-out blocks as discussed in the aforementioned Stephenson et al. application. Extending from the rear of the cap 14 toward the front thereof and aligned with each receptacle 16 is a cantilevered arm 17 having a distal end 18 which has a transverse pivot pin 19 having slightly rounded ends 21. The cantilevered arm 17 and pivot pin 19 are spaced from the upper planar surface 22 of the cap 14, as can best be seen in FIG. 2b. The configuration of the arm 17 can best be seen in FIGS. 2a and 2b which depict an adapter cap 23 configured for use with SC type couplers, FIG. 2a depicting the rear of cap 23 and FIG. 2b depicting, in cross-section, the side of cap 23. For simplicity, those elements of FIGS. 2a and 2b which directly correspond to like elements in FIG. 1 bear the same reference numerals. The cantilevered arm 17 is preferably formed integrally with the cap member 23, both comprising a suitable plastic material such as polyetherimide or polysulfone, which are resistant to fatigue, and, being resilient or "springy" when cantilevered, as is arm 17, able to maintain that resilience despite considerable use. Arm 17 has a U-shaped configuration, as shown in FIG. 2a, and extends to the rear of the cap and then forward parallel to and spaced from the upper surface 26 of cap 23. Located midway between the ends 21 of each of the pivot pins 19 is a cam member 27, the profile of which is best seen in FIG. 2b. Also as best seen in FIG. 2b, arm 17 has a slot 28 immediately behind pin 19, the purpose of which will be discussed more fully hereinafter. Each arm 17 has, on the top surface thereof, a wedge shaped protrusion 29 which is adapted to snap into corresponding slots in the adapter base member, as will be discussed hereinafter. The caps 14 and 23 are symmetrical, as seen in FIGS. 2a and 2b, and can be inserted into the base member of the adapter without the necessity of determining which is the top and which is the bottom.

FIG. 1 illustrates the three basic positions of a dust cover 31 in accordance with the present invention. Shutter 31, as will be more apparent hereinafter, has a first, closed position A; a second, partially open position B which is the position when an optical fiber connector, not shown, is inserted in one of the receptacles 16; and a third, fully open position C when access to the receptacle 16 is desired for cleaning, for example. The shutter is firmly held in each of the three positions A, B, and C.

Figure 3:
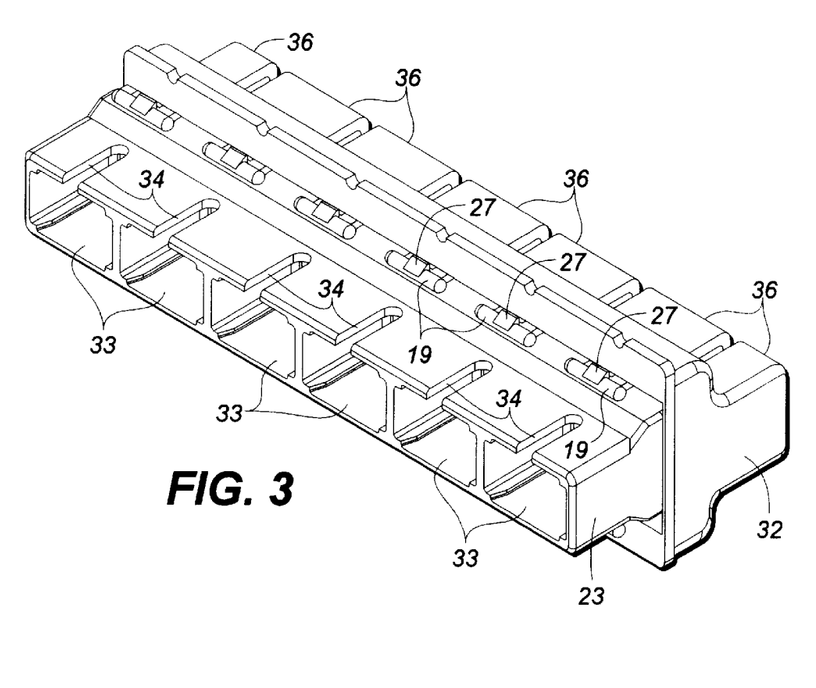
FIG. 3 is a perspective view of a ganged SC type adapter.
Figures 4, 5:
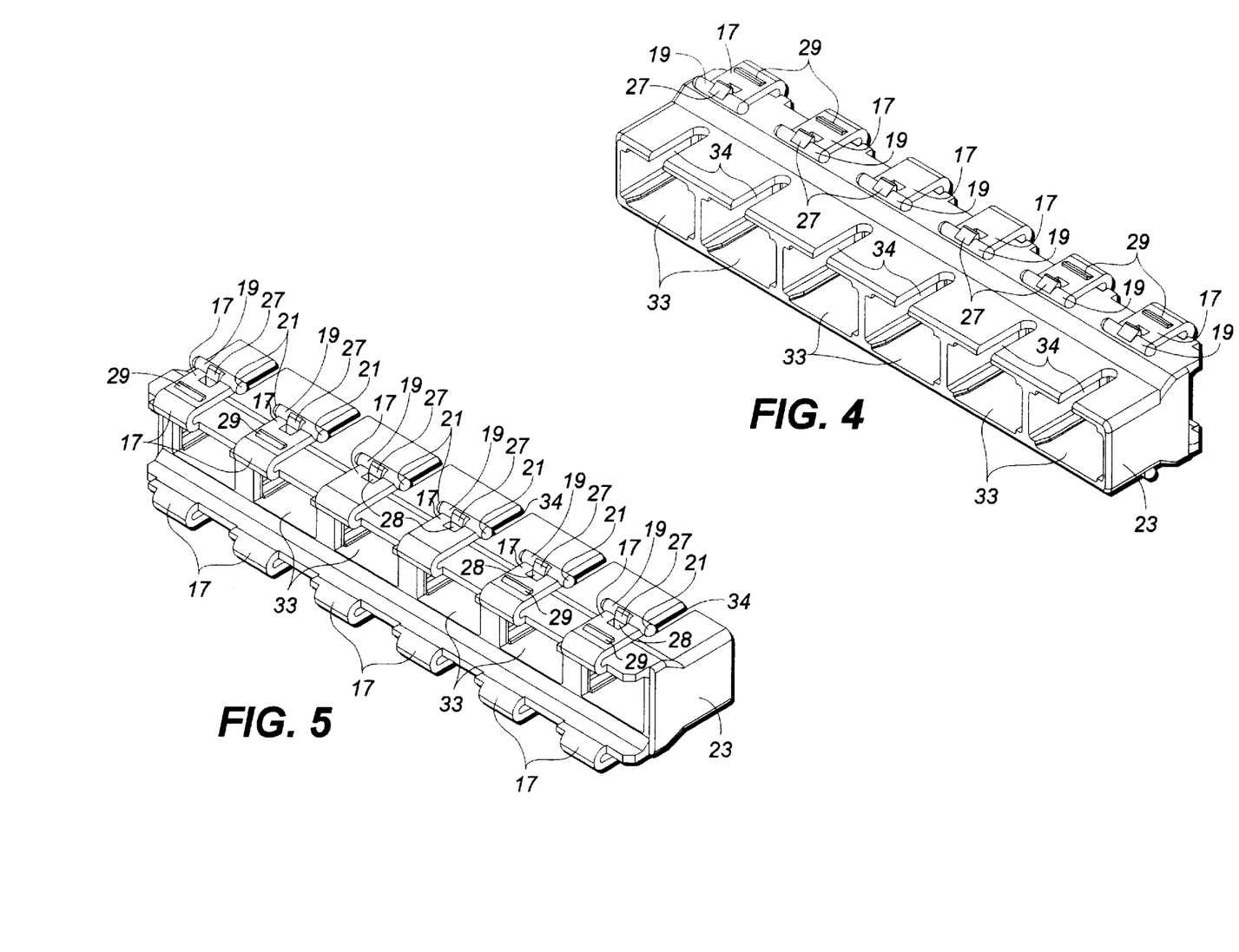
FIG. 4 is a frontal perspective view of the cap of the adapter of FIG. 3.
FIG. 5 is a rear perspective view of the cap of FIG. 4.

FIG. 3 is a perspective view of the adapter 13 for use with SC type couplers. Adapter 13 comprises the cap member 23 shown in FIGS. 2a and 2b and a base member 32 which are held together, by means of protrusions 29 being snapped into slots (not shown) in base member 32. Cap 23 has a plurality of rectangular openings 33 for receiving SC connectors, and key slots 34 for orienting the connectors in the openings 33. Base member 32 likewise has a plurality of openings 36 for receiving connectors, which may be any of a number of different types. Openings 36 may be pre-connectorized as discussed in the several prior art references. Although a gang type adapter having six openings is shown, it is to be understood that the adapter may comprise any practical number of openings, including just one, depending upon how many optical fiber connections are to be made. FIGS. 4 and 5 are front and rear perspective views, respectively of cap member 23. For adapter caps 14 or 23 which have a plurality of openings 16 or 33, as shown in FIGS. 3, 4 and 5, it is not necessary that all of the arms 17 have wedged shaped latching protrusions 29 so long as there are a sufficient number to hold the cap 23 firmly in base member 32.

Figure 6:
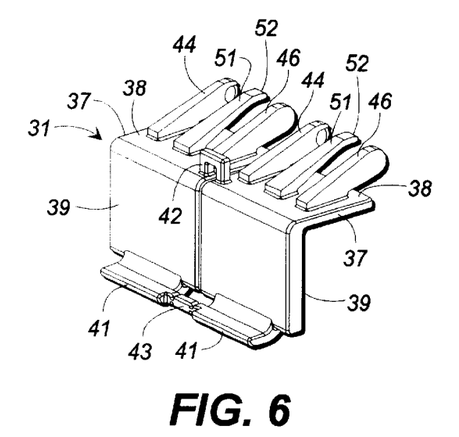
FIG. 6 is a frontal perspective view of the dust cover of the present invention.
Figure 7:
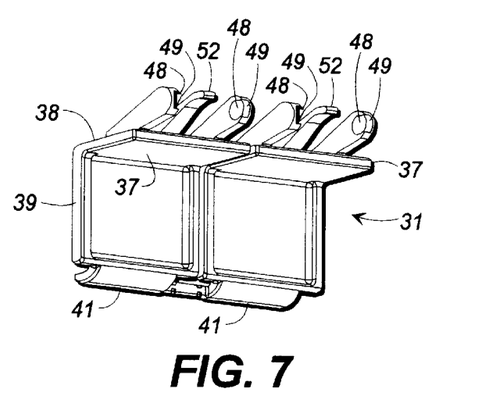
FIG. 7 is a rear perspective view of the dust cover.
Figure 8:
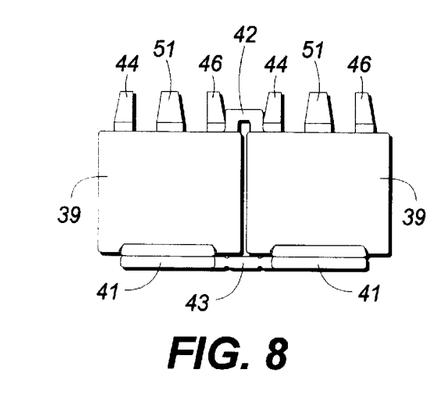
FIG. 8 is a front elevation view of the dust cover of the invention.
Figure 9:
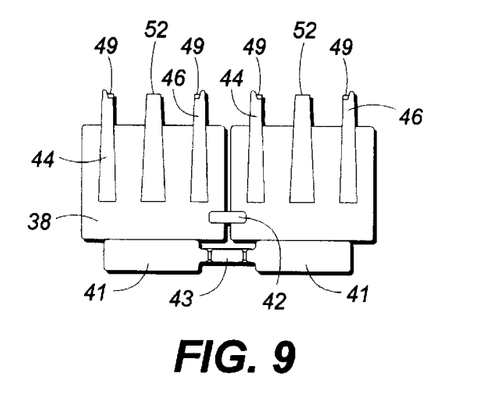
FIG. 9 is a plan view of the dust cover of the invention.
Figure 10:
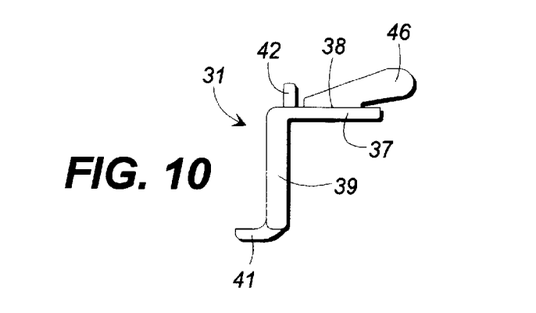
FIG. 10 is a side elevation view of the dust cover of FIGS. 8 and 9.

FIGS. 6 through 10 are various views of the dust cover member 31 which is adapted to be pivotably mounted on pivot pin 19 on cap member 14. As best seen in FIGS. 6, 7, and 9, member 31 has a substantially L-shaped profile having an upper leg 27, which has a planar top surface 38, and a depending leg 39 which is large enough to block the connector aperture in the cap. At the lower end of leg 39 is a transverse flange 41 which functions as an actuating member for pivotably raising or lowering the dust cover 31 in the manner taught in the aforementioned U.S. Pat. No. 5,687,268. In FIGS. 6 through 9, the dust covers 31 are depicted as being paired, being joined together by webs 42 and 43. It is more economical to cast the dust covers 31, which are made of suitable plastic material such as polyetherimide or polysulfone in this manner. Thus, a large number of dust covers may be cast or molded at one time, and, for fewer numbers, the webs 42 and 43 may be cut at the appropriate place.

Extending from the top surface 38 of each dust cover 31 at an angle thereto are first and second pivot arms 44 and 46 which are spaced apart as shown. The distal ends 47 of the arms 44 and 46 are enlarged to form interior faces, each of which has a detent recess 48 therein for receiving the rounded ends 21 of the pivot pin 19. A channel 49 leads into each detent recess 48 to facilitate insertion of the ends 21 of the pin 19 into the recesses 48, which, when accomplished forms a pivot mounting arrangement for the dust cover 31. As was pointed out hereinbefore, the plastic material of which the dust cover and the pivot arms are made has a degree of resilience which, in effect, enables the pivot arms 44 and 46 to snap over the ends 21 of the pivot pin 19 and to grip the pivot pin while still being pivotable with respect thereto. The material specified in the foregoing, or other suitable material, provides the desired degree of resilience while still being resistant to fatigue.

Approximately centrally located between each pair of pivot arms 44 and 46 is a spring arm 51 which extends from surface 38 at an angle thereto which approximates the angle of arms 44 and 46, as best seen in FIGS. 6 and 7. The distal end 52 of each arm is slightly curved or flattened, as shown, the underside portion of the end 52 being adapted to bear against the cam member 27 on the adapter cap 14 or 23. The normal resilience of the spring arm 51 is sufficient to maintain it in contact with the camming surface of cam member 27 when the dust cover 31 is mounted in place on the pivot pin 19, regardless of the pivot position. The action of the spring arm 51 and the cam member 27 will be more readily understood by reference to FIGS. 11, 12, and 13.

Figure 11:
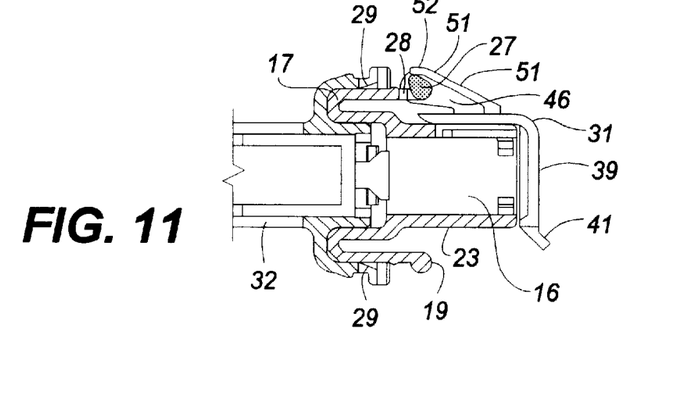
FIG. 11 is a partial, cross-sectional view of the dust cover of the invention mounted on the cap and in the closed position.

FIG. 11 depicts, in partial cross-section, the dust cover 31 in its closed position (position A) over a vacant SC connector receptacle 16 such as shown in FIG. 2(b), which, as discussed in connection with the figure, comprises adapter cap member 23 and base 32. It can be seen in FIG. 11 that the underside of the curved or flattened portion 52 of spring arm 51 bears against the camming surface of cam member 27, and the resilience or "springiness" of the arm 51 maintains the dust cover 31 in its closed position.

Figure 12:
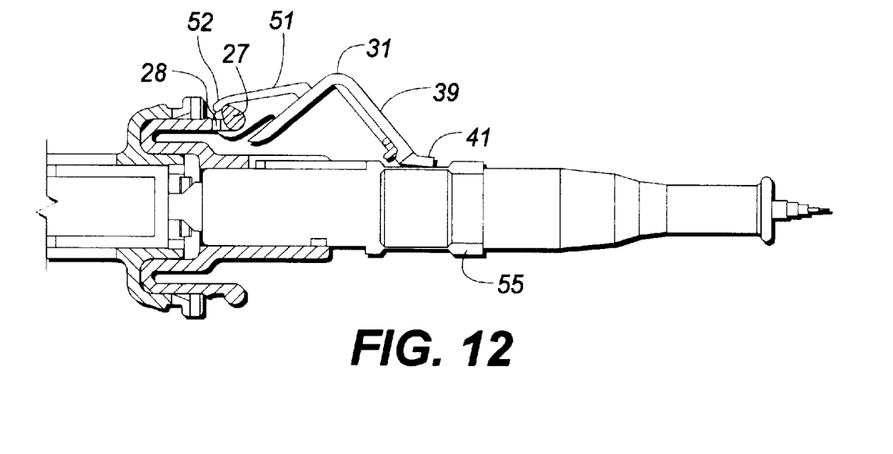
FIG. 12 is a partial, cross-sectional view of the dust cover of the invention with an SC type coupler inserted in the adapter.

FIG. 12 depicts the dust cover 31 in its intermediate position (position B), with an SC connector 59 in receptacle 16. The flattened or curved end 52 of spring arm 51 is pressing approximately on the offset high point of the cam lobe so that there is a force exerted to press toward the closed position of the dust cover 31, and it remains in position B as long as connector 53 is in place. As discussed in the foregoing Stephenson et al. U.S. Pat. No. 5,687,268, position B is reached by the installer using the connector 53 to bear against the underside of flange 41 to pivot the dust cover 31 from position A to position B.

Figure 13:
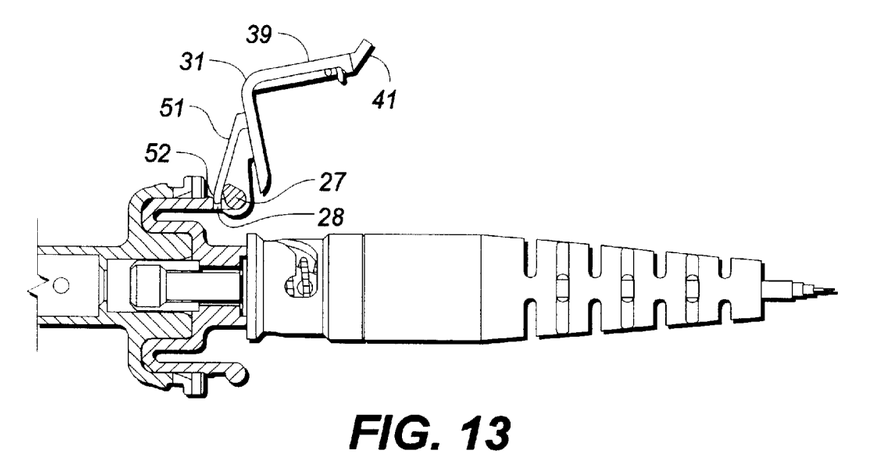
FIG. 13 is a partial, cross-sectional view of the dust cover of the invention in its fully open position, and with an ST type coupler mounted in the adapter.

FIG. 13 depicts the fully open position (position C) of dust cover 31. In FIG. 13, an ST type connector 54 is shown in place for illustrative purposes only. Position C is most often used when receptacle 16 is vacant, and provides access to the interior of the receptacle 16 for cleaning or for making measurements or tests, for example. It can be seen in FIG. 13 that the end 52 of spring arm 51 has been moved past the high point of cam member 27, with end 52 penetrating into slot 28. With the end 52 of spring arm 51 in the position shown, dust cover 31 will remain open despite gravity or other extraneous force, requiring a positively applied force to move it from position C. The spring action of arm 51 against cam 27 prevents any accidental dislodgment from position C.

From the foregoing description of a preferred embodiment of the invention, it can be seen that the dust cover of the invention, and the cover and adapter combination, achieve the desired improvements over the prior art arrangements. More particularly, the dust cover is universal, i.e., its configuration is such that it may be used with several different types of connectors and caps without modification. In addition, it is easy to mount to the adapter and has positive means for maintaining it in any of several positions, thereby avoiding accidental or undesired dislodgment. It affords both protection from contaminants for the adapter connections and at least some protection from light signals in the active receptacles prior to insertion of a connector therein. Numerous variations or modifications of the structure may occur to workers in the art without departure from the principles of the invention. Thus, spring arm 51 may comprise, for example, a metallic leaf spring, or pivot pin 19 may be affixed to the adapter cap in a manner other than that shown in the preferred embodiment. It is also possible, for example, that the pivot pin and cam might be located on the dust cover and the pivot arm and spring arm located on the adapter cap. All such variations or modifications are intended to be included within the scope of the present invention as set forth in the claims. Further, in the claims hereafter, the corresponding structures, materials, acts, and equivalents of all means or step plus function elements are intended to include any structure, material, or acts for performing the functions in combination with other claimed elements as specifically claimed.

We claim:

1. In combination, a coupling adapter and a dust cover wherein said adapter comprises a connector receptacle, said combination comprising:
   a dust cover member having a front surface adapted to cover said receptacle;
   a pivot member, said pivot member having a cam member thereon;
   first and second spaced pivot arms extending toward said pivot member, each of said pivot arms having a distal end having means for pivotably engaging said pivot member; and
   a spring arm extending between said dust cover and said cam member having a distal end adapted to bear against said cam member.

2. The combination as claimed in claim 1 wherein said pivot member comprises a pivot pin extending transversely across an upper surface of said adapter and spaced therefrom, said pivot pin having first and second ends.

3. The combination as claimed in claim 2 wherein said pivot pin is mounted to said adapter by means of a U-shaped cantilevered arm.

4. The combination as claimed in claim 2 wherein said means for engaging said pivot member comprises a detent recess in the distal end of each of said pivot arms for engaging said first and second ends of said pivot pin.

5. The combination as claimed in claim 2 wherein said cam member is located on said pivot pin intermediate said first and second ends.

6. The combination as claimed in claim 5 wherein said spring arm is located between said first and second pivot arms.

7. The combination as claimed in claim 6 wherein the distal end of said spring arm has a curved portion for engaging said cam member.

8. The combination as claimed in claim 7 wherein said spring arm is made of a resilient fatigue resistant material.

9. The combination as claimed in claim 7 wherein said dust cover member, said pivot arms, and said spring arm are made of a resilient fatigue resistant plastic material.

10. The combination as claimed in claim 9 wherein said plastic material is a polyetherimide material.

11. The combination as claimed in claim 9 wherein said plastic material is a polysulfone material.

12. An optical dust cover for use with an optical connector adapter having a connector receptacle open at one end and pivot means thereon, said dust cover comprising:
    blocking member for blocking the open end, said blocking member comprising a first transverse portion and a second transverse portion extending from said first transverse portion at an angle thereto; first and second spaced pivot arms extending from said second transverse portion at an angle thereto, each of said pivot arms having a free distal end;
    each of said distal ends having means for pivotably engaging the pivot means on the connector adapter; and
    a spring arm extending from said second transverse portion at an angle thereto.

13. An optical dust cover as claimed in claim 12 wherein said spring arm extends from said second transverse portion from a location between said spaced pivot arms.

14. An optical dust cover as claimed in claim 13 wherein said dust cover is substantially L-shaped, said second transverse portion comprising an upper leg thereof and said first transverse portion comprising a depending leg thereof, said upper leg having an upper surface from which said pivot arms and said spring arm extend.

15. An optical dust cover is claimed in claim 13 wherein said spring arm is made of a resilient fatigue resistant material.

16. An optical dust cover as claimed in claim 13 wherein said dust cover, said pivot arms, and said spring are are made of a resilient, fatigue resistant plastic material.

17. An optical dust cover as claimed in claim 16 wherein said material is a polyetherimide.

18. An optical dust cover as claimed in claim 16 wherein said material is a polysufone.

* * * * *